Sept. 16, 1958 J. K. HARRISON 2,852,107
BRAKE ASSEMBLY UTILIZING WEDGE-SHAPED MEMBERS
Filed Aug. 12, 1957

Inventor
John K. Harrison
By
Wenderoth, Lind & Ponack
Attys

United States Patent Office 2,852,107
Patented Sept. 16, 1958

2,852,107

BRAKE ASSEMBLY UTILIZING WEDGE-SHAPED MEMBERS

John Kirk Harrison, Granville, New South Wales, Australia

Application August 12, 1957, Serial No. 677,642

Claims priority, application Australia November 20, 1956

6 Claims. (Cl. 188—78)

The object of this invention is to provide an improved brake which is extremely efficient and is of simple and easily manufactured construction, and with which application of the brake is assisted by friction generated between the friction surfaces.

According to this invention a brake comprises a member having a surface movable with respect to another member, one or more wedge-shaped members, stops for the wedge-shaped members, and means for bringing the wedge-shaped members into contact with the said surface, whereby friction between the said surface and the wedge-shaped members forces them against the associated stops to wedge the wedge-shaped members between the stops and the surface. The movable surface may be a surface having linear motion, or more commonly rotational motion as in the case of the brake-drum of an automobile.

Reference will now be made to the accompanying drawings which show an automobile brake in accordance with the invention and in which.

Figure 3:
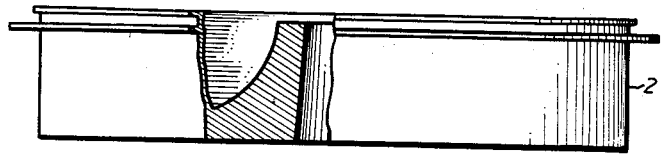
Fig. 3 is a plan showing the brake-drum assembled to the back-plate of the brake.

Referring to the drawings, the back-plate of the brake is shown at 1 and carries on it the operating parts of the brake. The inner circumferential surface of a brake-drum 2 (Figure 3) constitutes the movable surface and rotates about the center of the back-plate in the usual manner. The direction of rotation of the brake drum when the automobile is moving forward is shown by the arrow in Figure 1.

A plurality of wedge or egg-shaped members 3 are provided with their narrow ends facing in the direction of movement of that part of the brake-drum adjacent to them. Each wedge-shaped member 3 is pivoted at its wide end to a link 4 which in turn is pivoted at its other end to a lever arm 5. Stops 6 are provided adjacent each wedge-shaped member and tension springs 7 are provided between the links and the stops so as to hold the under edge of each member 3 against the associated stop. The lever arms 5 are pivoted to the back plate 1 at one end at 8, and means are provided to force the lever arms apart at the other end against a spring 9. Such means may be a hydraulic motor 10, a mechanical linkage operated for example by a Bowden wire cable 11, or any known mechanism used to force the brake shoes of an automobile or the like against a brake-drum.

Figure 1:
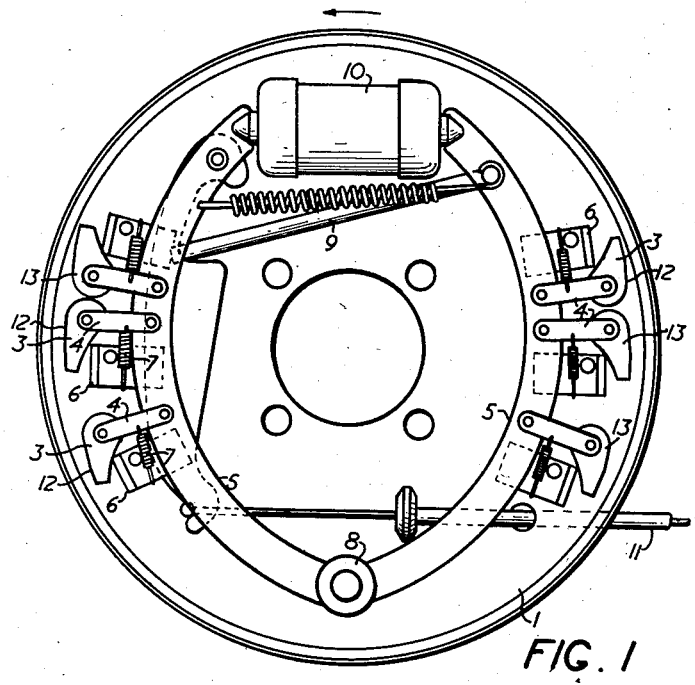
Fig. 1 is an elevation of the brake mechanism with the brake-drum removed.
Figure 2:
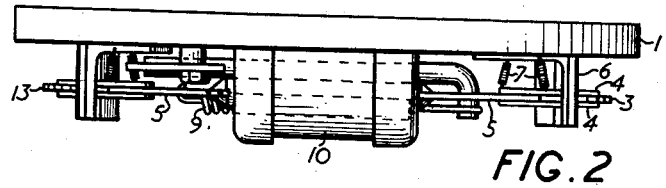
Fig. 2 is a plan of Fig. 1.

In the inoperative position shown in Figure 1 the outer edges 12 of the wedge-shaped members 3 are closely adjacent the inner circumferential surface of the brake-drum but are spaced from it. When the brakes are applied the lever arms 5 are forced apart and the edges 12 brought into contact with the brake-drum. Friction between the edges 12 and the brake-drum provides a force tending to wedge the members 3 more and more firmly between the brake-drum and the stops 6, thereby providing a very effective servo-operation.

To provide for servo-assistance for the brakes when the automobile is reversing a plurality of wedge-shaped braking members 13 are provided which face in the opposite direction to the members 3.

The wedge-shaped members 13 may be made of a suitable bronze.

What I claim is:

1. A brake assembly comprising a member having a surface movable with respect to another member, a support member displaceably secured to said another member, links pivotally secured to said support member and with their free ends directed toward the movable surface, wedge-shaped members pivotally secured at their wide ends to the free ends of the links, stop members secured to the said support member forwardly of the said links in the direction of normal movement of said movable surface, the said wedge-shaped members having their narrow ends directed toward the stops and with one sloping edge of each in contact with a stop, and means for displacing the said support member toward the said movable surface to bring the other sloping edges of the wedge-shaped members into contact with the said movable surface.

2. A brake assembly comprising a brake-drum, a back-plate fixed relative to the brake-drum, a plurality of wedge shaped members, a support member displaceably secured to the backplate, links pivotally secured to said support member and with their free ends directed toward the brake-drum and to which the wedge-shaped members are attached in such manner as to permit limited rotational movement of the wedge-shaped members, stops for the wedge-shaped members attached to said support, and means for displacing the support to bring a sloping edge of each wedge-shaped member into contact with the brake-drum, the disposition being such that friciton between the said brake-drum and the wedge-shaped members forces them between the stops and the brake-drum.

3. A brake assembly comprising a brake-drum, a back-plate fixed relative to the brake-drum, arcuate lever arms displaceably secured to the back-plate inside the brake-drum, links pivotally secured to said lever arms with their free ends directed toward the internal circumferential or braking surface of the brake-drum, wedge-shaped members pivotally secured at their wide ends to the free ends of the links, stop members secured to the lever arms forwardly of the links in the direction of normal rotation of the brake-drum, the said wedge-shaped members having their narrow ends directed toward the stops, springs between the links and the stops, and means for displacing the said lever arms toward the brake-drum to bring the outer sloping edges of the wedge-shaped members into contact with the said braking surface.

4. A brake assembly as claimed in claim 3 and including wedge-shaped members facing in the opposite direction to the first-mentioned wedge-shaped members for use when the brake drum turns in the reverse direction to normal.

5. A brake assembly comprising a brake-drum, a back-plate fixed relative to the brake-drum, arcuate lever arms inside the brake-drums and displaceably secured to the back-plate, a plurality of links pivotally secured to the lever arms and directed outwardly therefrom and approximately along radial lines of the brake-drum, wedge-shaped members pivotally secured at their broad ends to the free ends of the links and with their narrow ends directed in the direction of normal rotation of the brake-drum, stops secured to the lever arms and having an edge under one sloping edge of the wedge-shaped members and means for displacing the lever arms outwardly to bring the other sloping edges of the wedge-shaped members into contact with the inner circumferential surface of the brake-drum.

6. A brake assembly as claimed in claim 5 and including further wedge-shaped members with their narrow ends directed in the opposite direction.

References Cited in the file of this patent

UNITED STATES PATENTS

| 469,013 | Des Georges | Feb. 16, 1892 |

FOREIGN PATENTS

| 559,707 | France | June 21, 1923 |
| 830,163 | Germany | Jan. 31, 1952 |